(12) United States Patent
Amiri

(10) Patent No.: US 9,571,495 B2
(45) Date of Patent: Feb. 14, 2017

(54) METHODS AND SYSTEMS FOR AUTHORIZING WEB SERVICE REQUESTS

(71) Applicant: General Electric Company, Schenectady, NY (US)

(72) Inventor: Dariush Mario Amiri, San Ramon, CA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 14/290,492

(22) Filed: May 29, 2014

(65) Prior Publication Data

US 2015/0350212 A1    Dec. 3, 2015

(51) Int. Cl.
*G06F 17/00* (2006.01)
*H04L 29/06* (2006.01)

(52) U.S. Cl.
CPC ............ *H04L 63/10* (2013.01); *H04L 63/126* (2013.01)

(58) Field of Classification Search
CPC .. G06F 21/6209; G06F 21/6218; H04L 63/10; H04L 63/126
USPC ............................................................ 726/1
See application file for complete search history.

(56) References Cited

U.S. PATENT DOCUMENTS

| | | | |
|---|---|---|---|
| 7,370,075 B2 | 5/2008 | Farquharson et al. | |
| 7,841,005 B2 | 11/2010 | Betts et al. | |
| 8,196,125 B2 | 6/2012 | Maes | |
| 8,321,921 B1 | 11/2012 | Ahmed et al. | |
| 8,402,525 B1 | 3/2013 | Shah et al. | |
| 8,452,881 B2 | 5/2013 | Boubez et al. | |
| 8,484,348 B2 | 7/2013 | Subramanian et al. | |
| 8,578,487 B2 | 11/2013 | Soeder et al. | |
| 2011/0030041 A1 | 2/2011 | Favazza et al. | |
| 2011/0138453 A1* | 6/2011 | Verma | H04L 63/0815 726/8 |
| 2014/0020077 A1* | 1/2014 | Court | H04L 63/1466 726/8 |

FOREIGN PATENT DOCUMENTS

WO      2005069823 A2      8/2005

* cited by examiner

*Primary Examiner* — Morshed Mehedi
*Assistant Examiner* — Abiy Getachew
(74) *Attorney, Agent, or Firm* — Buckley, Maschoff & Talwalkar LLC

(57) ABSTRACT

Systems and methods for authorizing web service requests. In some embodiments, a computer-implemented method includes receiving a web service request having an authorization header and business code, authenticating a Security Assertion Markup Language (SAML) token included in the authorization header and constructing a security context based on attributes of the SAML token. The process also includes passing the security context to an authorization interceptor to interact with a policy information point (PIP) and a policy decision point (PDP), receiving a permit response, and then authorizing the web services request. In some implementations, the requested web service is then transmitted to the client computer that requested the web service.

16 Claims, 4 Drawing Sheets

METHODS AND SYSTEMS FOR AUTHORIZING WEB SERVICE REQUESTS

BACKGROUND

Embodiments of the invention generally relate to authenticating and authorizing web service requests. In some embodiments, an enforcement point intercepts web service requests and authenticates and authorizes them based on the content of the request.

Apache CXF is an open source services framework. CXF is utilized by developers to build and develop services using front-end programming application protocol interfaces (APIs), such as JAX-WS and JAX-RS. JAX-WS is used for XML-based services only, particularly SOAP, while JAX-RS is used for RESTful services and can support any data encoding. These services can speak a variety of protocols such as SOAP, XML/HTTP, RESTful HTTP, or CORBA and work over a variety of transports such as HTTP or JMS.

Conventional approaches for providing access control for web services involve creating a security context that a web service must process to determine if the client is authorized to perform the action before executing any business logic. However, any change in authorization policy requires making changes to the code containing the application business logic. In order to make this task less onerous, some frameworks permit the annotation of sections of the code. Although this is somewhat easier than modifying the code itself, it still involves modification of the package that contains the web service business logic and requires re-compilation and restart of the runtime.

For authentication, some frameworks provide callback methods that the developer must implement for performing the required authentication requests. Even though the code for these callbacks is typically separated from the business logic, the callback code is still often found in the same package, which means that if there is a change in authentication policy then re-compilation and restart of the runtime is necessary.

The present inventor recognized opportunities for providing methods and systems for configuring authentication and authorization logic for web service calls which do not require modification of any of the business logic and do not require re-compilation and restart of the runtime.

BRIEF DESCRIPTION

Systems and methods are presented for authorizing web service requests. In some embodiments, a computer-implemented method includes receiving a web service request having an authorization header and business code, passing the web services request to an authentication interceptor to authenticate a Security Assertion Markup Language (SAML) token in the authorization header, and receiving an authentication indication. The computer-implemented process also includes constructing a security context based on attributes of the SAML token, passing the security context to an authorization interceptor to interact with a policy information point (PIP) and a policy decision point (PDP), receiving a permit response, and then authorizing the web services request. In some implementations, the requested web service is then transmitted to the client computer that requested the web service.

In some embodiments, an apparatus includes a processor and a memory in communication with the processor. The memory stores program instructions, and the processor is operative with the program instructions to perform functions as set forth in the preceding paragraph.

DETAILED DESCRIPTION

Apparatus and processes are disclosed for permitting a developer or user to provide security to (or to protect) web services. In particular, the apparatus and processes provide authentication and authorization controls that can be utilized without having to directly modify the web service code (or the business code). Instead, a developer can, via the configurations described herein, enable an enforcement point that intercepts a web service request and authenticates and authorizes the web service request based on the content of the request.

The embodiments disclosed herein are set forth to aid in an understanding of the subject matter of this disclosure, but are not intended to, and should not be construed to limit in any way the claims appended hereto. Therefore, while specific terminology is employed for the sake of clarity in describing some exemplary embodiments, the present disclosure is not intended to be limited to the specific terminology so selected, and it is to be understood that each specific element includes all technical equivalents which operate in a similar manner.

Embodiments of the methods and systems described herein leverage CXF and Apache Karaf. CXF is a library that provides a bus for building web services, and Apache Karaf is an OSGi container for Java-based applications (such as web services). OSGi is a specification which defines a component and service model for the Java programming language. The OSGi specification describes a module system and service platform for Java that implements a complete and dynamic component model. Applications or components, coming in the form of bundles for deployment, can be remotely installed, started, stopped, updated, and uninstalled without requiring a reboot. In addition, the management of Java packages and/or classes may be specified in great detail. Application life cycle management is implemented via Application Programming Interfaces (APIs) that allow for remote downloading of management policies. The service registry allows bundles to detect the addition of new services, or the removal of services, and adapt accordingly. In accordance with systems and processes described herein, a CXF bus is configured to intercept web service requests to authenticate and authorize the user before forwarding the request to the java object that provides the business logic of the web service.

Figure 1:
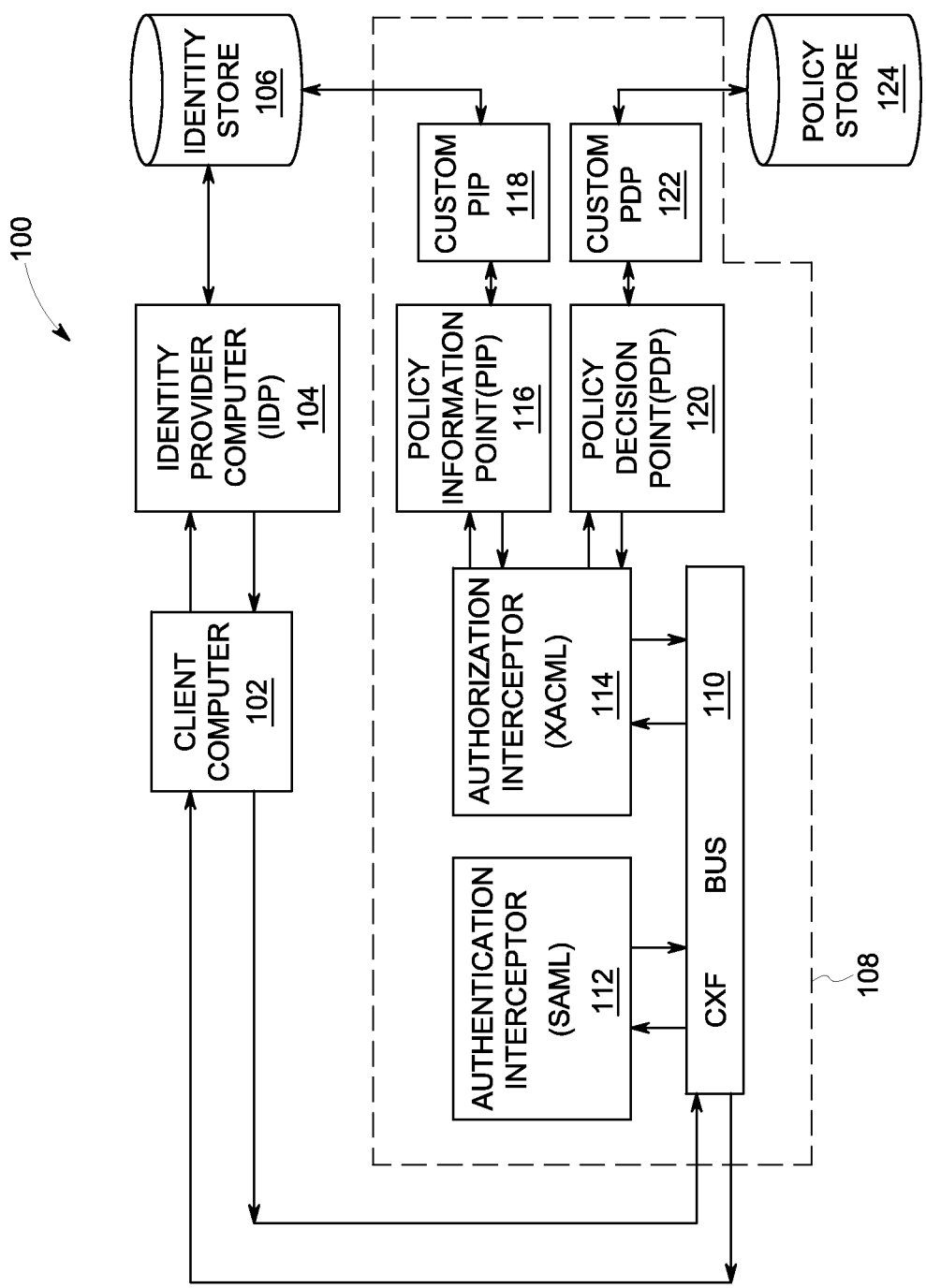
FIG. 1 is a block diagram of a system architecture for authenticating and authorizing web service requests at runtime according to an embodiment.

FIG. 1 is a block diagram of a system architecture 100 for authenticating and authorizing web service requests at runtime according to an embodiment. FIG. 1 thus illustrates an example of a logical architecture for describing methods and systems for authenticating and authorizing web service requests at runtime, but it should be understood that other implementations may also be utilized that include more or less and/or different components that could be arranged in different manners.

In accordance with embodiments disclosed herein, the authentication and authorization of a web services request are provided as a composite feature to a solution developer, and the Security Assertion Markup Language (SAML) is used. SAML is a standard for providing signed assertions that services can use for authentication and authorization decisions. Thus, implementations disclosed herein utilize a SAML token, which is a digitally signed assertion of an identity represented by the client. Accordingly, in some embodiments the solution developer at time of service registration enables SAML authentication for a RESTful service by including an attribute key of: "com.ge.dsp.webservice.auth.enable" with a value of "true" in the service attribute map passed to a processor. For convenience, the attribute key may be included in the "CoreConstants" class as a public, static and final field: "DSP_AUTH_ENABLE". Thus, when the solution developer enables the DSP_AUTH_ENABLE flag, then the RESTful service will return a 401 (unauthorized) error to any client that does not include a valid SAML token in the Authorization header of their web services request. Thus, to authenticate with the service, a client has to first obtain a valid SAML token from an identity provider, base 64 encode that assertion or SAML token, pre-pend the value "SAML", and include the information in the header (for example: Authorization: SAML <base 64 encoded assertion>).

In addition, in order for the web service to accept a SAML token as valid, an administrator needs to configure a trust relationship between a Relying Party (RP) and the identity provider (IdP) that issued the SAML token. In some embodiments, to establish the trust relationship, an administrator must obtain a java key store that contains the public certificate that the identity provider uses to sign the SAML tokens. In an implementation, an administrator could create the key store themselves and then import a public DER (Distinguished Encoding Rules) encoded certificate using the java key tool distributed with the Java Runtime Environment (JRE) and the Java Development Kit (JDK). In any case, the RP and the IdP must exchange the public certificates associated with their digital signatures. The administrator must also create a java properties file with the following properties:
   a) org.apache.ws.security.crypto.provider=<crypto provider>
   b) org.apache.ws.security.crypto.merlin.keystore.type= <keystore type e.g. jks>
   c) org.apache.ws.security.crypto.merlin.keystore. password=<keystore password>
   d) org.apache.ws.security.crypto.merlin.keystore.alias= <alias that uniquely identifies certificate in the key store>
   e) org.apache.ws.security.crypto.merlin.keystore.file= <location of key store>
In addition, The administrator must also, in the "In dsp/config/dsp.core.conf," set the "dsp.webservice.auth.trustStorePropertiesFile" property to the location of the properties file created in the previous step.

Referring again to FIG. 1, a client computer 102 first obtains a SAML token from a trusted third party identity provider (IdP) computer system 104 which, in this example implementation, is operably connected to an Identity Store 106. The SAML token must contain at least one claim, which uniquely identifies the user (known as the "identity claim"). As explained above, trust between the IdP computer 104 and the web services (which may be called a Relying Party (RP) and is represented in FIG. 1 by dotted line 108) is configured out-of-band by exchanging public certificates during an initial configuration phase. In some implementations, the client computer 102 compresses and encodes the SAML token, inserts the SAML token into the HTTP Authorization header of a web services request, and then transmits the web services request to the Relying Party 108.

The web services request from the client computer 102 (which includes a SAML token) is intercepted for authorization purposes in two phases, and before the business logic of the web service is processed. First, an Authentication Interceptor 112 (which may be referred to as the "SAML interceptor") performs an authentication step, and then second, an Authorization Interceptor 114 (which may be referred to as the "XACML interceptor") performs an authorization step. In particular, when a developer and/or user registers with the service manager service and enables the "auth" feature (the authorization feature), then the service manager service enables both the SAML interceptor and the XACML interceptor to work in conjunction to provide both SAML based authentication and XACML based authorization.

Referring again to FIG. 1, after receiving the SAML token, the client computer 102 transmits the web services request (which includes the SAML token) to the RP 108, and in particular to the CXF bus 110 which directs it to the Authentication Interceptor 112. The Authentication Interceptor 112 strips the contents of the HTTP authorization header of the web services request and converts the data back into a SAML token. The Authentication Interceptor 112 then verifies the signature of the SAML token, makes sure it was not tampered with, checks that it was signed by a trusted IdP 104, and checks to make sure that the SAML token has not expired. If the web services request does not include a SAML token, or if the SAML token is not valid or not trusted, then the Authentication Interceptor 112 transmits an "unauthorized" error message (for example, a "401" code message) to the CXF bus 110 which is transmitted back to the client computer 102 and the process ends. But if the Authentication Interceptor 112 determines that the SAML token is valid and trusted, then the authentication phase is successful and the Authentication Interceptor 112 constructs a security context based on the attributes included in the SAML token and passes that to the Authorization Interceptor 114.

In some embodiments, the Authorization Interceptor 114 is implemented as an eXtensible Access Control Markup Language (XACML) interceptor. XACML is a standard that defines authorization policy and processing based on the eXtensible Markup Language (XML) and is a portable language for access control supported by many vendors. Since requests for authorization processing and authorization policy information are in XML, the standard is independent of considerations such as platform, technology stack, and the like. In addition, XACML enables Attributes Based Access Control (ABAC), which means that authorization decisions are made based on attributes associated with the current subject, action, resources, and environment. This allows for the creation of complex and fine-grained authorization policies. Attributes can be anything from subject location to subject role membership. Thus, the traditional concept of Role Based Access Control (RBAC) is a subset of ABAC and XACML and is well suited to creating and enforcing RBAC based policies for authorization. Thus, the XACML interceptor is set up by sub-classing the CXF "AbstractXACMLAuthorizingInterceptor" class and overriding the "performRequest" method. The "performRequest" method returns an XACML response that the "AbstractXACMLAuthorizingInterceptor" interprets to throw a Security Exception if the decision in the result is anything but "permit." In addition, the web services provider wires a fault interceptor that translates the Simple Object Access Protocol (SOAP) fault generated by the CXF interceptor to an HTTP response with either a 401 (unauthorized) a 403 (forbidden) or a 500 (internal server error) status code. This is to make the response REST friendly. A web services provider distributed service enabler wires the XACML interceptor when the DSP_AUTH_ENABLED flag is set.

With reference to FIG. 1, when the Authorization Interceptor (XACML interceptor) 114 receives the web service request, it then constructs an XACML authorization request from the security context set by the Authentication Interceptor (SAML interceptor) 112. The XACML authorization request is thus constructed from the identity of the user contained in the SAML token (which was passed by the Authentication Interceptor 112; and this is known as the subject of the request), the URL target of the web service request (which is known as the resource of the request), and the HTTP method of the web service request (which is known as the action of the request, such as GET, POST, PUT, DELETE, and the like).

The Authorization Interceptor 114 next communicates with two pluggable services to perform its authorization duty: a pluggable Policy Information Point (PIP) service 116 and a pluggable Policy Decision Point (PDP) service 120. In some embodiments, the Authorization interceptor first transmits the XACML authorization request to the configured PIP 116 which understands XACML, which further enhances or modifies the authorization request with contextual information necessary to make an authorization decision (for example, role or group membership information about the subject performing the action, or location information concerning the resource the subject is trying to access). The PIP 116 may interact with a custom PIP 118 to enhance and/or modify the authorization request. Next, when the Authorization Interceptor 114 receives the modified and/or enhanced XACML authorization request from the PIP 116, it sends it to a Policy Decision Point (PDP) 120 (which may be an external component) for evaluation. The PDP 120 may interact with a Custom PDP 122 and/or with a Policy Store 124 during evaluation of the enhanced XACML authorization request.

The Policy Store 124 contains information concerning who is permitted to perform particular actions against a resource. Thus, the PDP 120 evaluates the authorization request again the policies in the Policy Store 124 and decides if an action represented by the authorization request is permitted or not. The PDP 120 therefore determines which response to return, which can be either "permit", "deny", "not applicable", or "indeterminate." If the response is anything other than "permit" then the caller of a RESTful web service will receive a "401" unauthorized response. Otherwise the call will complete successfully, meaning that the web services request is authorized.

In some embodiments, both the PIP 116 and the PDP 120 are pluggable, which means that the solution developer may create their own implementation. This provides a tremendous degree of flexibility since it allows users to both enrich information about the operation in progress through the PIP 116 as well as giving users full control of the authorization decision logic (through the PDP).

Figure 2:
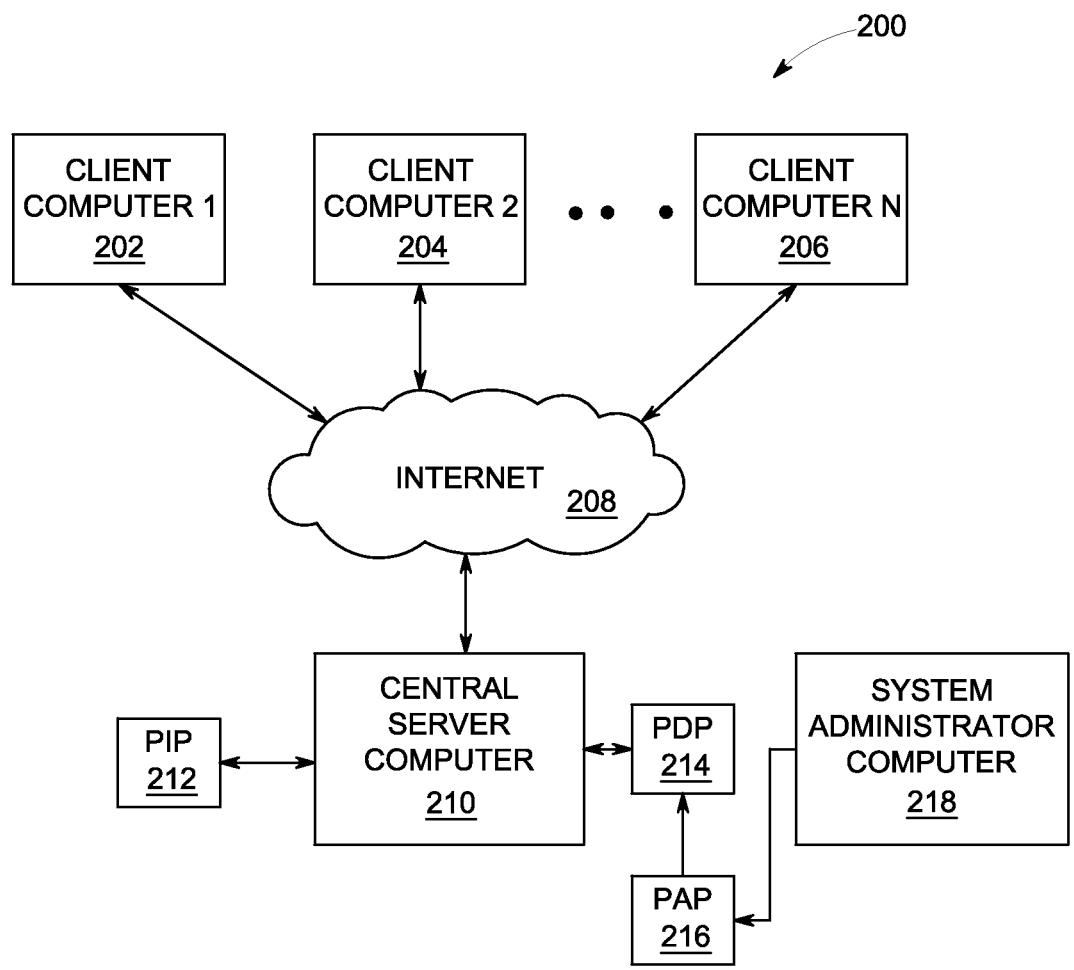
FIG. 2 is a block diagram of a web services system according to another embodiment of the disclosure.

FIG. 2 is a block diagram of a web services system 200 according to another embodiment. Client computer1 202, client computer2 204, and client computerN 206 represent a plurality of client computers which may all be in wired or wireless communication with the Internet 208 (and more or less of such client computers may be utilized). A central server computer 210 is also in communication with the Internet 208, and is operably connected to a Policy Information Point (PIP) 212 and a Policy Decision Point (PDP) 214. The PDP 214 is also operably connected to a Policy Administration Point (PAP) 216, which is operably connected to a system administrator computer 218.

The central server computer 210 processes web services requests from the client computers 202 to 206 as explained herein. In particular, the central server computer 210 receives one or more web services requests from one or more of the client computers 202. 204. 206 and is configured to check for the presence of a SAML token in the header of the request, authenticate the SAML token, and construct a security context. The central server computer 210 is also configured to construct an authorization request and transmit it to the PIP 212, which enhances and/or modifies it and returns an enhanced authorization request. The enhanced authorization request is processed by the PDP 214 using policies provided by a PAP 216, which may receive the policies from the system administrator computer 218. If the processing results in a "permit" response, then the web services request is authorized, and the central server computer 210 transmits the requested webs service to the client computer that made the web service request.

Figure 3:
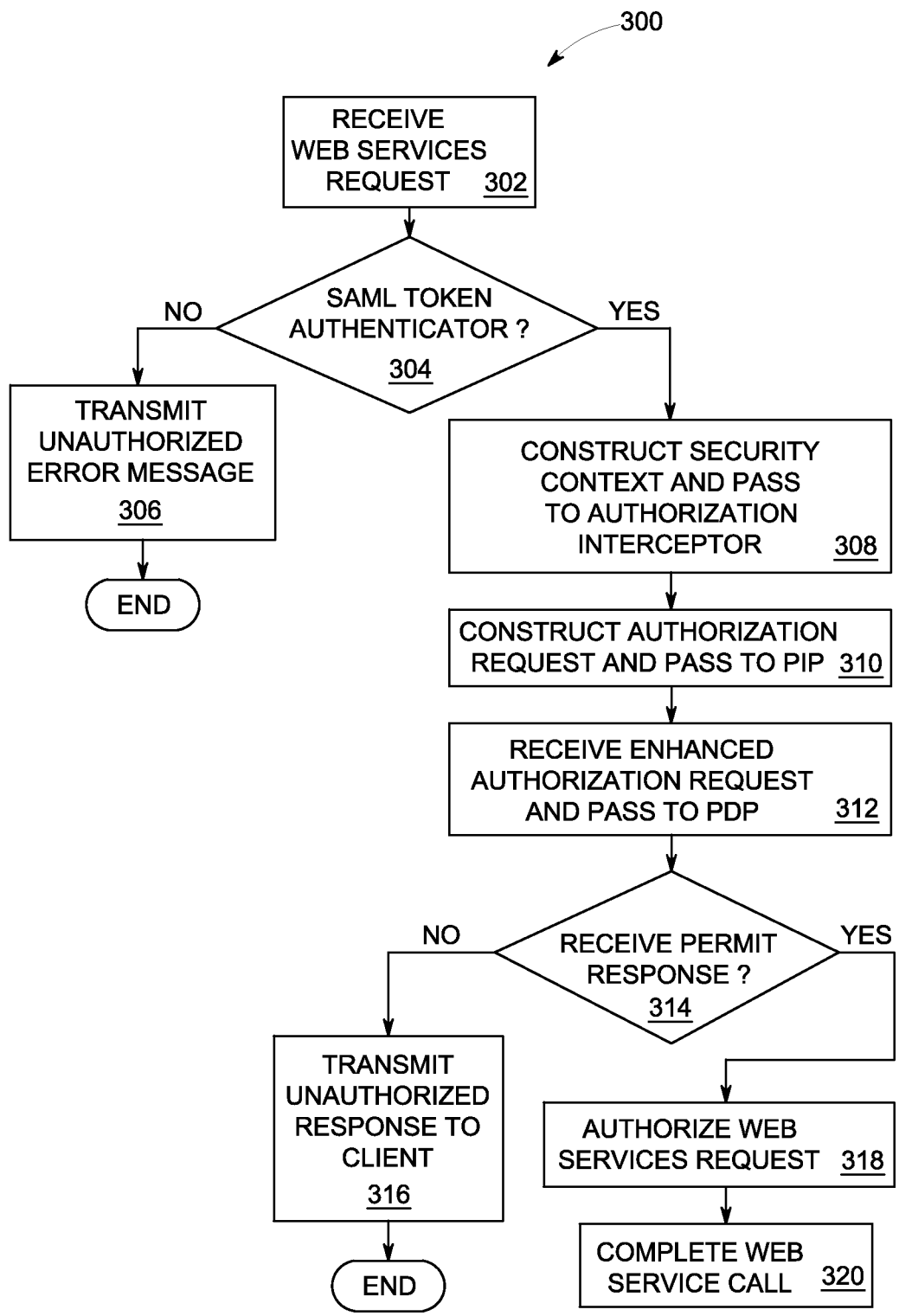
FIG. 3 is a flow diagram of an operation according to some embodiments.

FIG. 3 is a flowchart 300 of a method for authenticating and authorizing a web services request according to some embodiments. A central server computer receives 302 a web services request from one or more client computers and strips the contents of an HTTP authorization header of the web services request, and converts the data back into a SAML token. The central server computer utilizes an authentication interceptor API process to authenticate 304 the SAML token by verifying the signature of the SAML token, ensuring that it was not tampered with, checking that it was signed by a trusted Identity Provider, and checking that the SAML token has not expired. If the web services request is not authenticated (for example, the header did not include a SAML token, or the SAML token was found to be not valid or not trusted), then the central server computer transmits 306 an "unauthorized" error message (for example, a "401" code message) to the client computer that sent the request, and the process ends.

However, if in step 304 the SAML token is authenticated 304 (i.e., was found to be valid and trusted), then the authentication phase is successful and a security context is constructed 308 based on the attributes included in the SAML token and passed to and authorization interceptor. Next, an authorization request (an XACML authorization request) is constructed 310 from the identity of the user contained in the SAML token (known as the subject of the request), the URL target of the web service request (known as the resource of the request), and the HTTP method of the web service request (known as the action of the request, such as GET, POST, PUT, DELETE, and the like). The XACML authorization request is passed to a configured PIP, which understands XACML, and the PIP further enhances or modifies the authorization request with contextual information necessary to make an authorization decision (for example, role or group membership information about the subject performing the action, or location information concerning the resource the subject is trying to access). The enhanced XACML authorization request from the PIP is then passed to a Policy Decision Point (PDP) for evaluation 312. The PDP may interact with a Custom PDP and/or with a Policy Store during the evaluation process regarding the enhanced XACML authorization request in order to come to a conclusion, and the PDP will return a response of either: "permit", "deny", "not applicable", or "indeterminate." If a "permit" response is not received 314, then a "401" unauthorized response is transmitted 316 to the client computer that initiated the web service call, and the process ends. However, if a "permit" response is received 314, then the web services call is authorized 318 and the web service completes 320 the web services request.

Figure 4:
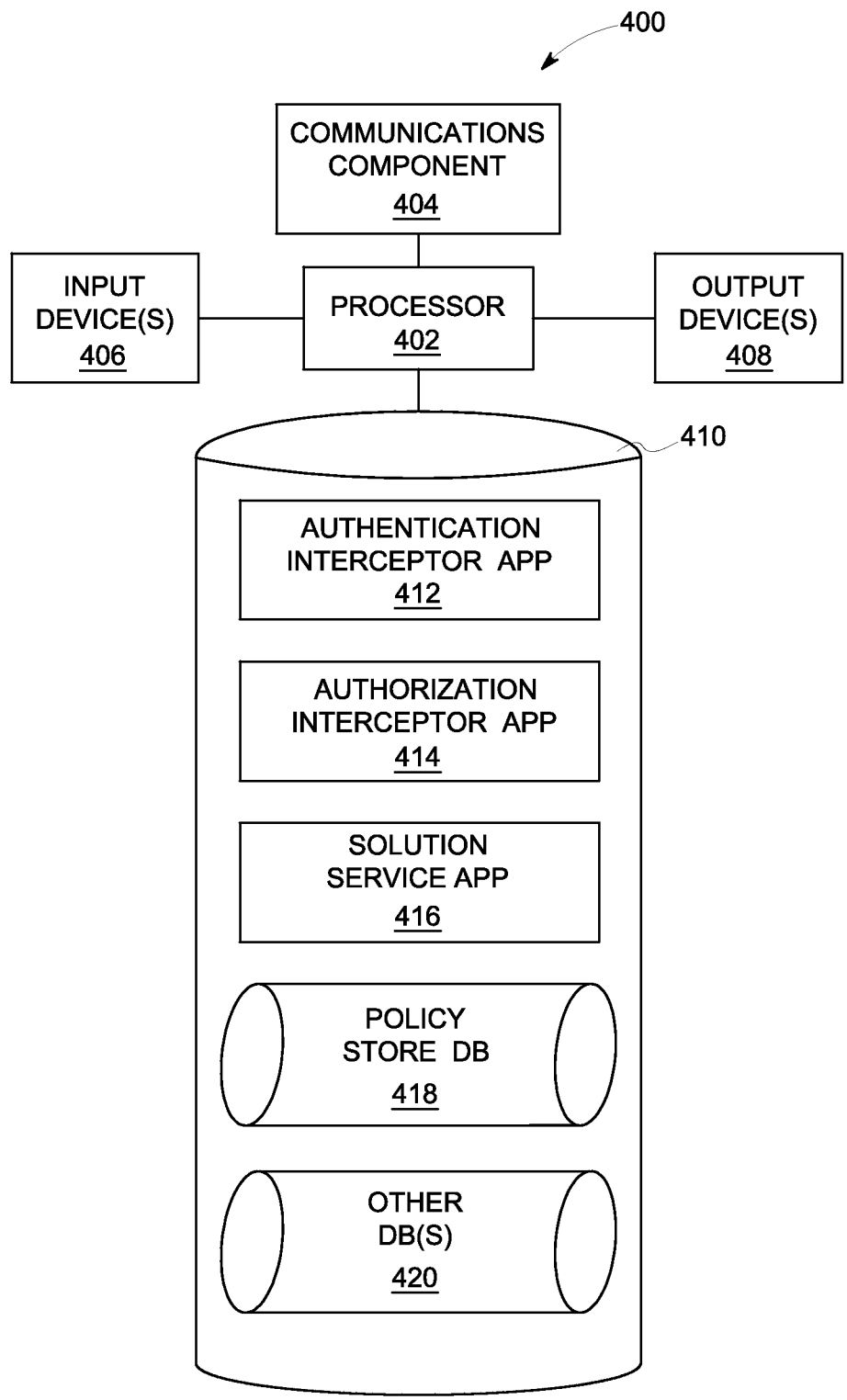
FIG. 4 is a block diagram of a Web Services Authorization server computer for processing web services requests according to some embodiments.

FIG. 4 is a block diagram of a Web Services Authorization server computer 400 for processing web services requests according to some embodiments. The Web Services Authorization server computer 400 may be conventional in its hardware aspects but may be controlled by software to cause it to operate in accordance with aspects of the methods presented herein. In particular, the Web Services Authorization server computer 400 may include a computer processor 402 operatively coupled to a communication device 404, one or more input devices 406, one or more output devices 408, and a non-transitory storage device 410.

The computer processor 402 may constitute one or more conventional processors manufactured by companies such as Intel Corporation and the like. Processor 402 operates to execute processor-executable steps, contained in program instructions described herein, so as to control the Web Services Authorization server computer 400 to provide desired functionality.

Communication device 404 may be used to facilitate communication with, for example, other devices (such as for receiving web service requests from client computers, and for transmitting an error message or web service call data to a client computer). Communication device 404 may also, for example, have capabilities for engaging in data communications over conventional computer-to-computer data networks, including the Internet, in a wired or wireless manner. Such data communications may be in digital form and/or in analog form.

Input device 406 may comprise one or more of any type of peripheral device typically used to input data into a computer. For example, the input device 406 may include a keyboard and a mouse and/or a touchpad that may be used, for example, by a systems engineer or other personnel authorized to, for example, perform Web Services Authorization server computer system maintenance or other tasks. The output device 408 may comprise, for example, conventional output components such as a display and/or a printer.

The non-transitory storage device 410 may comprise any appropriate information storage device, including combinations of magnetic storage devices (e.g., magnetic tape and hard disk drives), optical storage devices such as CDs and/or DVDs, and/or semiconductor memory devices such as Random Access Memory (RAM) devices and Read Only Memory (ROM) devices, as well as flash memory devices. Any one or more of the listed storage devices may be referred to as a "computer readable medium", "memory", "storage", or "storage medium". The non-transitory storage device 410 stores one or more programs for controlling processor 402. The programs comprise program instructions that contain processor-executable process steps of the Web Services Authorization server computer 400, including, in some cases, process steps that constitute processes provided in accordance with principles of the processes presented herein.

The programs may include an authentication interceptor application 412 that manages a process by which a web services request is authenticated. In some embodiments, the authentication interceptor application operates to strip the contents of a HTTP authorization header of the web services request and convert the data back into a SAML token. The authentication interceptor application 412 then attempts to verify the signature of the SAML token, checks for tampering, checks that it was signed by a trusted Identity Provider, and makes sure that the SAML token has not expired before authenticating the web service request.

The non-transitory storage device 410 also stores an authorization interceptor application 414 which may be implemented as an eXtensible Access Control Markup Language (XACML) interceptor application. The XACML interceptor may be configured to construct an XACML authorization request from the security context set by the authentication interceptor application 412. In such a case, the XACML authorization request may be constructed from the identity of the user contained in the SAML token, the URL target of the web service request, and the HTTP method of the web service request. The authorization interceptor application 414 may also be configured to communicate with a pluggable Policy Information Point (PIP) service and a pluggable Policy Decision Point (PDP) service to perform authentication.

The non-transitory storage device 410 also stores a solution service application 416, which is operable to provide a web services call when the authorization interceptor application 414 authorizes the web services request. In such a case, the solution service application 416 may be configured to transmit the web service to a client computer.

The storage device 410 may also include a policy store database 418, which may include the policies and/or rules applicable to web service calls. In addition, the Web Services Authorization server computer 400 may maintain other databases 420 on the storage device 410.

The application programs of the Web Services Authorization server computer 400, as described above, may be combined in some embodiments, as convenient, into one, two or more application programs. Moreover, the storage device 410 may store other programs or applications, such as one or more operating systems, device drivers, database management software, web hosting software, and the like.

Accordingly, the systems and methods disclosed herein provide fine-grained authentication and authorization for a web service without requiring a developer to have to recompile or restart any of the business logic providing the results. In particular, the disclosed systems and methods permit a developer using a client computer to configure the authentication and authorization logic of a web service without having to touch the code that provides the business logic. As described above, the web service bus controls the authentication and authorization processes in conjunction with the Authentication Interceptor (the SAML interceptor) and the Authorization Interceptor (the XAML interceptor), which perform the authentication and authorization processing before the code performing any business logic. The authentication is based on the presence of data in the HTTP Authorization header, which does not interfere with the syntax for the actual web service request, and thus the web services code itself does not change because the developer just adds the HTTP Authorization header to it. In addition, the authorization of the web services request is based entirely on the examination of the contents of the web request. If the web request is RESTful and the URL resource is properly designed then a developer can completely avert the need for any authorization logic within their business logic. Furthermore, a technical affect of the authorization decision being offloaded to a decision point (for example, the Relying Party or RP 108 of FIG. 1) is that authorization policies can be changed at any time and become immediately effective without affecting the web service business logic. The entire authentication and authorization logic can thus advantageously be plugged in at runtime without having to modify the runtime objects providing the business logic of the web service.

The disclosed processes do not require alteration of the web service business logic to enable fine-grained authentication and authorization, and thus a technical effect is that a significant amount of development time is saved. In addition, because the authentication and authorization processes can be hot-swapped at runtime without having to touch or modify the web service business logic, system downtime is reduced. In addition, since the authentication and authorization components are pluggable these access controls are simpler to customize without changing any business logic. Moreover, since authorization is offloaded to a central Policy Decision Point (PDP), the web services application becomes easier to maintain. Accordingly, the systems and/or processes described herein reduce the costs of integration, maintenance, and securing the system.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of devices in communication via any number of other public and/or private networks. Two or more of such computing devices may be located remote from one another and may communicate with one another via any known manner of network(s) and/or a dedicated connection. Each device may include any number of hardware and/or software elements suitable to provide the functions described herein as well as any other functions. For example, any computing device used in an implementation of some embodiments may include a processor to execute program code such that the computing device operates as described herein.

All systems and processes discussed herein may be embodied in program code stored on one or more non-transitory computer-readable media. Such computer-readable media may include, for example, a floppy disk, a CD-ROM, a DVD-ROM, a Flash drive, magnetic tape, and solid-state Random Access Memory (RAM) or Read Only Memory (ROM) storage units. Embodiments are therefore not limited to any specific combination of hardware and software.

Embodiments described herein and/or depicted in the figures are solely for the purpose of illustration. A person of ordinary skill in the relevant art may recognize other embodiments that may be practiced with various modifications and/or alterations to that described herein.

What is claimed is:

1. A computer-implemented method for authorizing web service requests, comprising: receiving, by a web services authorization computer from a client computer, a web service request comprising an authorization header and business code; passing, by a CXF bus of the web services authorization computer, the web services request to an authentication interceptor component of the web services authorization computer to authenticate a Security Assertion Markup Language (SAML) token included in the authorization header; receiving, by the CXF bus from the authentication interceptor component, an authentication indication and constructing a security context based on attributes of the SAML token; passing, by the CXF bus, the security context to an authorization interceptor component of the web services authorization computer to interact with a policy information point (PIP) and a policy decision point (PDP); receiving, by the CXF bus from the authorization interceptor component, a permit response indicating authorization of authorizing the web services request and transmitting, by the web services authorization computer, the requested web service to the client computer, wherein authenticating the SAML token comprises: verifying, by the authentication interceptor component, the signature of the SAML token; determining, by the authentication interceptor component, that the SAML token was not tampered with; determining, by the authentication interceptor component, that the SAML token was signed by a trusted Identity Provider; and determining, by the authentication interceptor component, that the SAML token has not expired.

2. The computer-implemented method of claim 1, further comprising, prior to receiving an authentication indication:
   determining that at least one of the SAML token is improperly signed, the SAML token was tampered with, the SAML token was not signed by a trusted Identity Provider, and the SAML token has expired; and
   transmitting an unauthorized error message to a client computer that requested the web service.

3. The computer-implemented method of claim 1, further comprising, prior to receiving a permit response:
   constructing, by the authorization interceptor, an eXtensible Access Control Markup Language (XACML) authorization request;
   passing, by the authorization interceptor, the XACML authorization request to the PIP;
   receiving, by the authorization interceptor, an enhanced XACML authorization request from the PIP;
   passing, by the authorization interceptor, the enhanced XACML authorization request to the PDP; and
   receiving, by the authorization interceptor, a response from the PDP.

4. The computer-implemented method of claim 3, wherein the response from the PDP comprises one of deny, not applicable, or indeterminate, and further comprising transmitting an unauthorized error message to a client computer that requested the web service.

5. The computer-implemented method of claim 3, wherein the authorization interceptor constructs the XACML authorization request based on the identity of the user contained in the SAML token, the resource of the web service request, and the action of the web service request.

6. A non-transitory computer readable medium storing instructions configured to cause a web services authorization computer processor to: receive a web service request from a client computer comprising an authorization header and business code; pass the web services request to an authentication interceptor component of the web services authorization computer to authenticate a Security Assertion Markup Language (SAML) token included in the authorization header; receive an authentication indication from the authentication interceptor component and a security context based on attributes of the SAML token; pass the security context to an authorization interceptor component of the web services authorization computer for processing by a policy information point (PIP) and a policy decision point (PDP); receive a permit response from the authorization interceptor component indicating authorization of the web services request, and transmit the requested web service to a client computer that requested the web service, wherein authenticating the SAML token comprises: verifying, by the authentication interceptor component, the signature of the SAML token; determining, by the authentication interceptor component, that the SAML token was not tampered with; determining, by the authentication interceptor component, that the SAML token was signed by a trusted Identity Provider; and determining, by the authentication interceptor component, that the SAML token has not expired.

7. The non-transitory computer readable storage medium of claim 6, wherein the instructions for authenticating the SAML token are configured to cause the web services authorization computer processor to:
    verify the signature of the SAML token;
    determine that the SAML token was not tampered with;
    determine that the SAML token was signed by a trusted Identity Provider; and
    determine that the SAML token has not expired.

8. The non-transitory computer readable storage medium of claim 6, further comprising, prior to the instructions for receiving an authentication indication, instructions configured to cause the web services authorization computer processor to:
    determine that at least one of the SAML token is improperly signed, the SAML token was tampered with, the SAML token was not signed by a trusted Identity Provider, and the SAML token has expired; and
    transmit an unauthorized error message to a client computer that requested the web service.

9. The non-transitory computer readable storage medium of claim 6, further comprising, prior to the instructions for receiving a permit response, instructions configured to cause the web services authorization computer processor to:
    receive one of a deny response, a not applicable response, or an indeterminate response; and
    transmit an unauthorized error message to a client computer that requested the web service.

10. A system for authorizing web service requests, comprising: a central server computer; a Policy Information Point (PIP) operably connected to the central server computer; a Policy Decision Point (PDP) operably connected to the central server computer; and a Policy Administration Point (PAP) operably connected to the PDP; wherein the central server computer operates to: receive a web service request comprising an authorization header and business code from a client computer; authenticate a Security Assertion Markup Language (SAML) token included in the authorization header; construct a security context based on attributes of the SAML token; construct an authorization request; transmit the authorization request to the PIP; receive an enhanced authorization request from the PIP; transmit the enhanced authorization request to the PDP for processing based on policies provided by the PAP; receive a permit response from the PDP and authorize the web services requested and transmit the requested web service to the client computer, wherein authenticating the SAML token comprises: verifying, by the authentication interceptor component, the signature of the SAML token; determining, by the authentication interceptor component, that the SAML token was not tampered with; determining, by the authentication interceptor component, that the SAML token was signed by a trusted Identity Provider; and determining, by the authentication interceptor component, that the SAML token has not expired.

11. The system of claim 10, further comprising a system administrator computer operable to provide policies to the PAP.

12. The system of claim 10, wherein the central server computer further comprises an authentication interceptor operable to authenticate the SAML token.

13. The system of claim 10, wherein the central server computer further comprises an authorization interceptor operably connected to the PIP and the PDP.

14. The system of claim 10, further comprising a custom PIP operably connected to the PIP.

15. The system of claim 10, further comprising a custom PDP operably connected to the PDP.

16. The system of claim 15, further comprising a Policy Store operably connected to the PDP.

* * * * *